United States Patent [19]

Simpson et al.

[11] Patent Number: 5,142,837
[45] Date of Patent: Sep. 1, 1992

[54] ROOF STRUCTURE

[75] Inventors: Robert S. Simpson, Fresno; Robert E. Simpson, Mt. Vernon, both of Ohio

[73] Assignee: Mineral Fiber Manufacturing Corporation, Coshocton, Ohio

[21] Appl. No.: 800,279

[22] Filed: Nov. 29, 1991

Related U.S. Application Data

[60] Division of Ser. No. 530,788, May 30, 1990, Pat. No. 5,096,759, which is a continuation-in-part of Ser. No. 225,053, Jul. 27, 1988, Pat. No. 4,936,938, and a continuation-in-part of Ser. No. 508,572, Apr. 11, 1990.

[51] Int. Cl.$^5$ .................. E04B 5/10; B32B 7/12; B32B 11/04; B32B 11/06
[52] U.S. Cl. .................. 52/409; 52/419; 428/141; 428/189; 428/291; 428/332; 428/352; 428/457; 428/489; 428/491; 428/906
[58] Field of Search .............. 52/408, 409, 309.1, 52/518, 521, 528, 419

[56] References Cited

U.S. PATENT DOCUMENTS

| | | | |
|---|---|---|---|
| 2,742,115 | 4/1956 | Strong | 52/409 |
| 3,095,671 | 7/1963 | Fink et al. | 52/409 |
| 3,770,559 | 11/1973 | Jackson | 428/40 |
| 3,900,102 | 8/1975 | Hurst | 428/40 X |
| 3,937,640 | 2/1976 | Tajima et al. | 156/71 |
| 4,055,453 | 10/1977 | Tajima et al. | 156/337 |
| 4,374,687 | 2/1983 | Yamamoto | 156/337 |
| 4,386,981 | 6/1983 | Clapperton | 156/337 |
| 4,514,442 | 4/1985 | Crepeau | 156/71 |
| 4,589,804 | 5/1986 | Paeglis et al. | 156/71 |
| 4,670,071 | 6/1987 | Cooper et al. | 156/71 |
| 4,767,653 | 8/1988 | Renstrom | 52/409 X |
| 4,870,796 | 10/1989 | Hart et al. | 52/409 |

Primary Examiner—David A. Scherbel
Assistant Examiner—Kien Nguyen
Attorney, Agent, or Firm—Sidney W. Millard

[57] ABSTRACT

A laminated roofing material includes an aluminum foil top sheet laminated to a polyethylene film by an ionomer resin. After the sheets are bonded together they are cooled to set the resin and a asphalt coating is applied to the exposed polyethylene sheet and covered with a release paper. The roofing material is applied over an underlayment to form a roof supported by conventional sheeting material.

4 Claims, 4 Drawing Sheets

ROOF STRUCTURE

This application is a division of application Ser. No. 530,788, filed May 30, 1990, now Pat. No. 5,096,759 which is a continuation-in-part of copending applications Ser. No. 225,053, filed July 27, 1988, now Pat. No. 4,936,938 and Ser. No. 508,572, filed Apr. 11, 1990.

FIELD OF THE INVENTION

This invention relates to making laminated roofing materials and the resulting roofing product.

BACKGROUND OF THE INVENTION

A roofing product needs a means for attaching the roofing to the surface to be covered, a strengthening layer to maintain the integrity of the roofing layer and an upper surface to be in contact with the environment to minimize the exposure of the layers below.

It is well recognized that the ultraviolet rays from the sun are most destructive to exposed asphalt surfaces.

Applications of coal-tar and asphalt layers as part of a sheet of roofing must be shielded from the sunlight to increase the useful life of the roofing. The ultraviolet light tends to polymerize the hydrocarbon molecules and harden the surface which results in cracking of the asphalt and leaks in the roof. Conventional ways of shielding the asphalt layer is with crushed rock or gravel, flakes of aluminum, aluminum paint, etc.

Examples of two attempts to solve the roofing problem are illustrated in U.S. Pat. Nos. (Jackson) 3,770,559 and (Hurst) 3,900,102.

The Jackson patent discloses a plurality of layers having an aluminum foil sheet bonded to a bituminous adhesive re-enforced with a nylon-fabric.

The Hurst patent discloses a surface coating material for masonry surfaces which includes a fabric impregnated with a bitumen mixture.

SUMMARY OF THE INVENTION

A roofing material according to the instant invention includes an upper layer of aluminum foil to reflect infrared and ultraviolet rays impinging on the roofing from the sun. The aluminum may be relatively thin and very flexible because it is not intended to serve as a strengthening element. The reflected infrared rays reduce the heat transmitted to the roofing surface. The ultraviolet rays reflected reduce the cracking of the bitumen layer due to reduced polymerization of the incorporated hydrocarbons.

The aluminum foil is bonded to a high density polyethylene film by an ionomer resin. The polyethylene film is to provide structural integrity of the roofing sheet and while it has a good elasticity and strength in tension, it is sufficiently resilient to hold or pull the roofing back into its original shape even though it may be temporarily distorted by tension forces.

The under side of the polyethylene film includes a coating of asphalt. The asphalt coating serves as an adhesive to bond the upper layer of the roofing to the roof itself or any incorporated underlayment. Additionally, the asphalt has the property of being self-sealing at 60. F. and above and will tend to seal punctures and breaks in the polyethylene film should any occur, thereby maintaining the integrity of the waterproofing to be provided by the roofing material. The asphalt coating is a mixture of asphalt, styrenebutadiene radial block copolymer, aromatic processing oil, hydrocarbon tackifying resin, antioxidant, and finely ground silica sand. It is mixed and blended in unique proportions and under unique physical conditions to achieve the desired puncture-proofing flowability characteristics.

The roofing is manufactured to be wound into a spiral roll and cut to appropriate sizes. As a result, a release paper is applied to the exposed surface of the asphalt coating to prevent the asphalt from adhering to whatever it comes into contact with before the roofing sheet is applied to the appropriate surface.

The roofing may be wound in a spiral roll with the release paper being in direct contact with the aluminum foil upper sheet and a conventional roll is thirty-six inches wide and thirty-three and one-half feet long.

In addition to forming new roofs, this roofing product may be used as a patching material to patch leaks in existing conventional roofs, walls, gutters, or the like when cut to narrow widths.

In applying the roofing, it may be necessary to clean the roofing surface before the roofing material is applied. For proper adhesion the roofing of this invention must be applied to a clean dry surface which is relatively flat and is free from loose debris, oils, greases, or the like. In some instances it may be appropriate to use a butyl caulking to enhance the edge bonding of the roofing material or to seal around the edge of said roofing material.

In some instances an underlayment may be appropriate between the existing roof and the roofing material. In such instances the underlayment will provide better adhesion between the two surfaces and increased structural stability to the roofing material.

Objects of the invention not clear from the above will be fully understood from a review of the attached drawings and the description of the preferred embodiments which follow.

DESCRIPTION OF THE PREFERRED EMBODIMENTS

Figure 1:
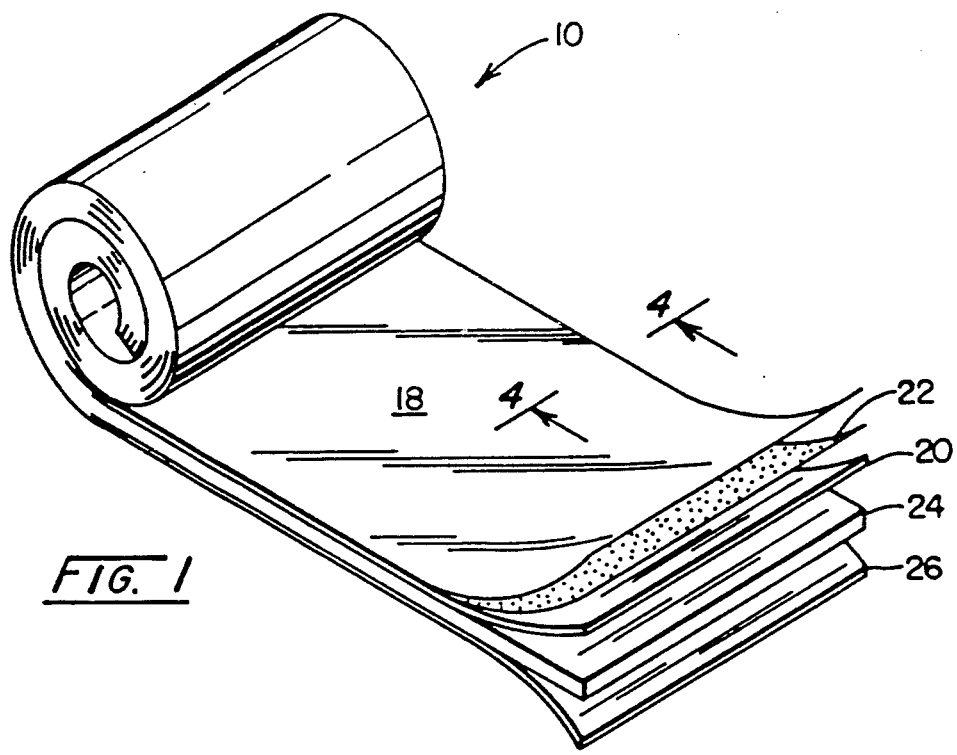
FIG. 1 is a perspective view of a roll of roofing according to this invention showing the various layers, not in proportion.
Figure 2:
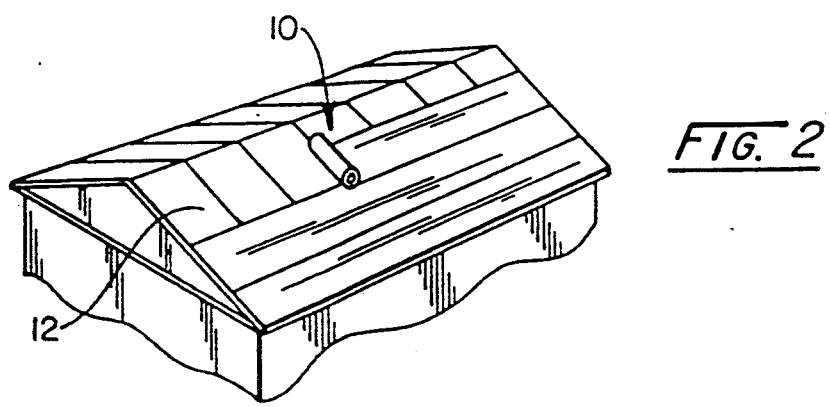
FIG. 2 is a perspective view illustrating a way the roofing material would be applied to a roof.
Figure 3:
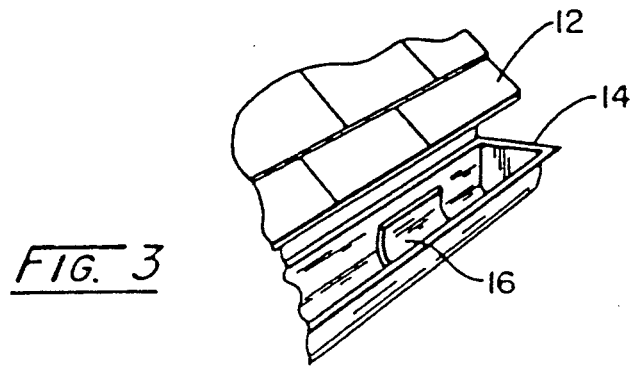
FIG. 3 is a perspective view showing a piece of the roofing material used to patch a hole in a gutter.

Looking to FIGS. 1-4, a roll or sheet of roofing material 10 is provided having five layers which will be described subsequently. In particular FIG. 2 illustrates the application of the roofing material to a roof 12. FIG. 3 shows the roof 12 having an attached gutter 14 and a patch 16 of the roofing material which is bonded into the gutter to patch a leak.

Figure 4:
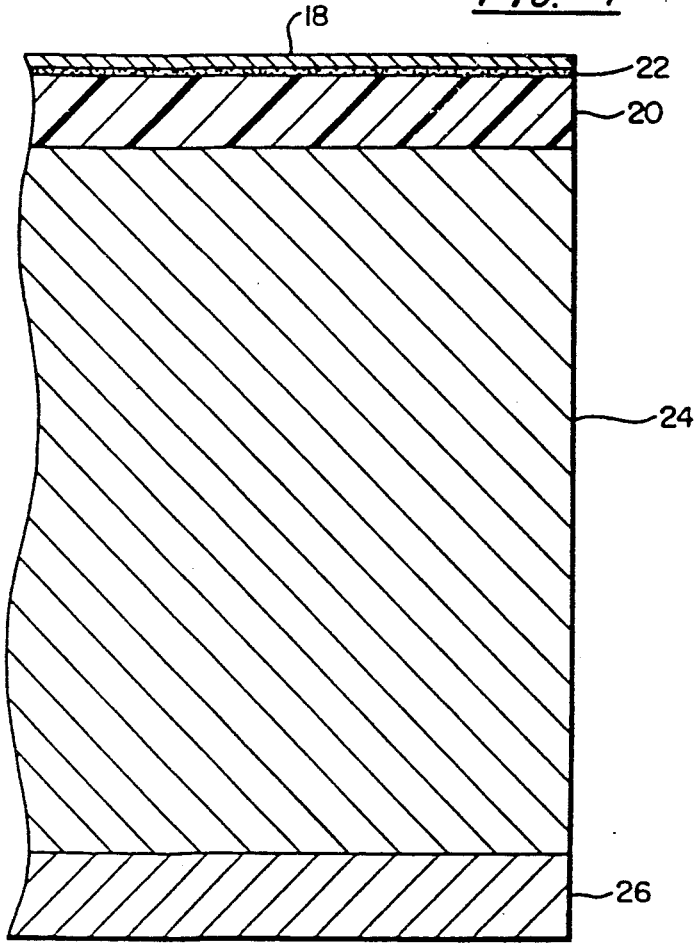
FIG. 4 is a sectional view taken along line 4—4 of FIG. 1 showing the rough proportions in thickness of the various layers of the roofing material.

FIG. 4 illustrates the roofing material in section to give a rough idea of the proportional thicknesses of the layers of product involved in this invention. The uppermost surface is the one to be exposed to sunlight and the environment in general and it is an aluminum foil sheet 18 having a desired thickness of about 0.0007 inches. It is adhesively bonded to a polyethylene sheet 20 (having a thickness of about 0.004 inches) by an ionomer resin adhesive 22. The preferred resin adhesive is sold by the DuPont Company under the trademark SURLYN but other equivalent resins would be within the concept of the invention. A suitable cross-link high-density polyethylene film is purchased from Van Leer Plastics Company under the trademark VALERON 4020.

A coating of asphalt 24 is bonded to the surface of the polyethylene sheet 20 and is intended to serve as an agent to seal around punctures or cracks which may occur in polyethylene layer 20 and to bond the roofing laminate to the surface to be covered. To prevent the asphalt coating 24 from adhering to the aluminum foil when the roofing laminate is wound into a spiral roll, a release paper 26 is applied over the exposed asphalt surface. The preferred release paper is a densified bleached Kraft paper coated with a silicon compound for release. A suitable release paper is available from Mead Release Products, James River Corporation and any number of other sources.

Figure 5:
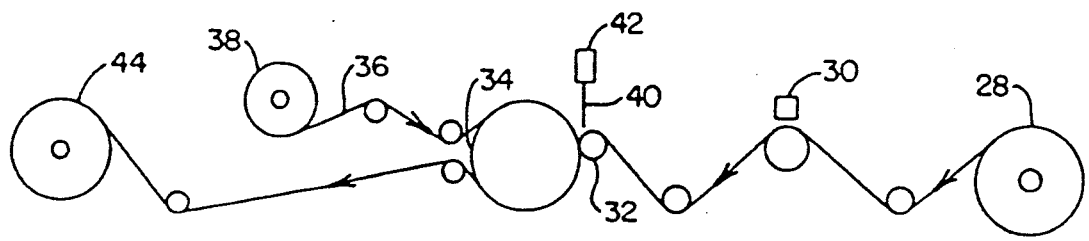
FIG. 5 is a diagrammatic view showing the first part of the manufacturing process where the aluminum foil is bonded to the polyethylene sheet.

Describing now the process of making the product and the apparatus for performing the manufacturing process as shown in FIG. 5, a roll of polyethylene film 28 is unwound and passed through a corona process or treatment station 30 which serves to make the surface of the polyethylene film more receptive to the adhesive to be applied between it and the aluminum foil. The polyethylene film continues along its route to pass between a pair of rollers 32, 34 which squeeze the polyethylene film against a correspondently sized sheet of aluminum foil 36 being feed from a supply roll 38. As the foil and film are being pressed together by rolls 32 and 34 an adhesive 40 is being extruded from a supply nozzle 42 to bond the aluminum and polyethylene sheets together The roll 34 is maintained at a temperature of about 35° F. to 40° F. and serves as chill roll to set the adhesive and form the initial laminate which may be collected on a roll 44 or the laminate could be supplied directly to the next laminating process shown in FIG. 7.

Figure 7:
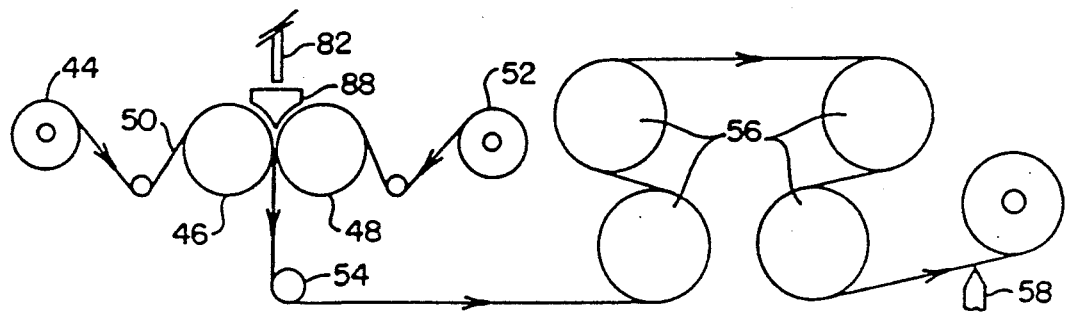
FIG. 7 is a diagrammatic view of the coating of the polyethylene sheet with asphalt and the simultaneous application of the release paper.

The roll of laminate 45 in FIG. 7 is an intermediate product and it will be passed between a second pair of rollers 46, 48 which are maintained at about 55° F. to chill the hot asphalt coating 24 as it is applied to the polyethylene sheet 20. Laminate 45 includes the laminate in roll 44 but with the polyethylene sheet 20 as the outside layer such that the laminate exiting rollers 46, 48 is in the sequence illustrated in FIG. 4.

The laminate from roll 45 passes as a sheet 50 over roll 46 simultaneously with a sheet of release paper 26 from a supply roll 52, the release paper passing over roll 48. The coating 24 of asphalt is applied in a thickness controlled by the spacing between rolls 46 and 48.

After the preliminary chilling of the asphalt coating 24 by chill rolls 46, 48, the five layer laminate is passed around a roll 54 which serves to press the release paper 26 more tightly against the asphalt layer 24 and further enhance the bonding of the asphalt layer to the polyethylene sheet. Thereafter, the five layer laminate passes over a series of cooling or chilling rolls 56 to bring the laminate down to near atmospheric temperature.

Note at the right-hand side of FIG. 7, the marker 58. There are in fact two markers, one on each side of the roofing to mark the desired overlap of the roofing rolls. A mark is in fact made on each side of the sheet, preferably three inches from the edge, to show the roofing installation workman the proper location of the subsequently supplied roofing sheet. A mark is made on each edge of the sheet because it is not certain which edge will be the upside of the roof during the assembly process.

During the initial research stages of the invention, consultation was had with an expert in the field of roof coating asphalts and an initial formulation was suggested. Various changes were made subsequently during the experimentation period and the following shows the original recommendation along with the current desired proportional ingredients:

| Ingredient | Original | Current |
|---|---|---|
| Asphalt | 51 parts | 63 |
| Solprene or Finaprene 411 | 5 | 4 |
| Solprene or Finaprene 1205 | 11 | 9 |
| Filler | 15 | 12 |
| Stalite | 0.25 | 0.4 |
| Sundex 790 | 12 | 7 |
| Escorez 2101 | 5 | 5 |

The asphalt is a straight-run (unblown) asphalt with a softening point of about 100°-120° F. and a penetration of 90-140 dmm (this is a standard designation of a grade of asphalt). SOLPRENE and FINAPRENE are styrene-butadiene linear block co-polymers, a thermal plastic elastomer. SOLPRENE is a trademark of Phillips Petroleum and FINAPRENE is a trademark of Fina Oil and Chemical Company. The products are functional equivalents.

The filler is a ground silica sand of about 325 mesh grade.

SUNDEX is a trademark of Sun Oil Company used in relation to an aromatic processing oil.

ESCOREZ is a trademark of Exxon Chemical Company and is used in relation to a hydrocarbon tackifying resin.

STALITE is a trademark of Vanderbilt Company and is used in association with an antioxidant which is incorporated into the system to minimize cross-linking of the molecules of the asphalt.

Figure 6:
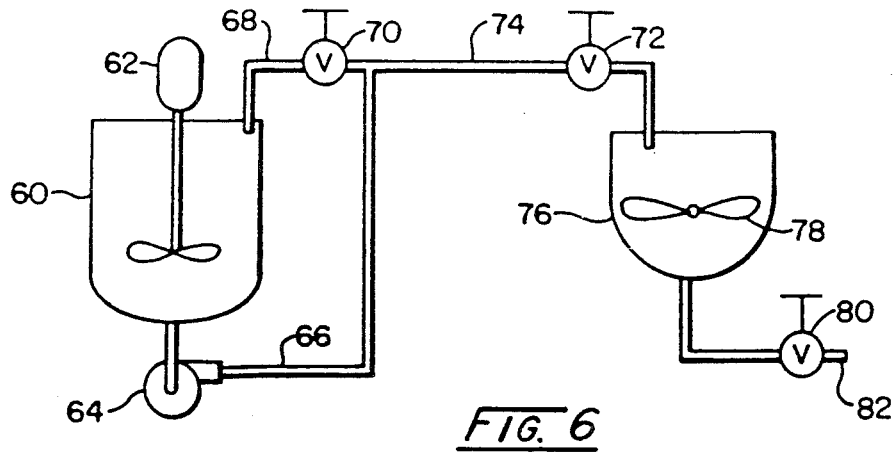
FIG. 6 is a diagrammatic view of the mixing system for the asphalt.

Looking now to FIG. 6, batches of the asphalt are initiated in a first mixing vat 60 where the asphalt is deposited at about 360°F. and the styrene-butadiene, antioxidant, aromatic processing oil, and hydrocarbon tackifying resin are added. The ingredients are mixed 62 in the vat and are circulated through a mixer/homogenizer 64 in recirculating pipes 66 and 68 for over an hour and preferably about seventy minutes. The homogenizer 64 is a vigorously acting pump; The asphalt mixture is rather viscous and as a result of the mixing and recirculation activities the temperature of the mixture will rise to about 390°–420° F. during the seventy minute homogenizing process.

After the asphalt mixture is satisfactorily homogenized it is discharged through pump 64 and pipe 66 by closing valve 70 and opening valve 72 such that the asphalt passes through piping 74 into a second or holding vat or tank 76.

In tank 76 the ground silica sand is deposited and mixed by a mixer 78 to a generally homogeneous consistency. When the holding tank 76 has the mixture adequately mixed it can be discharged by opening valve 80 and the asphalt will flow through pipe 82 to a space between and above rollers 46 and 48, see FIG. 7.

Figure 8:
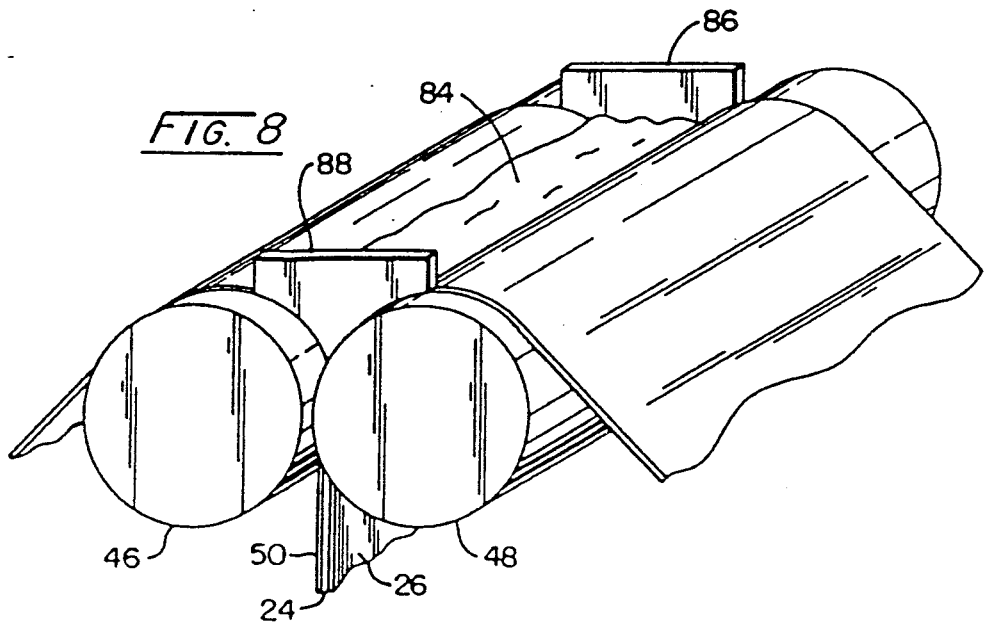
FIG. 8 is a perspective view of the way the asphalt is applied to the polyethylene layer.

Looking to FIG. 8, the asphalt mixture will be deposited in the space between rollers 46 and 48 and will form a puddle 84 between a pair of laterally spaced guides 86, 88 which will prevent lateral flow of the bitumen during the manufacturing process. It will be observed that the guides keep the asphalt from any direct contact with the rolls 46 and 48, thus the asphalt is confined between the release paper 26 and the laminate 50.

In the mixing of the sand and asphalt in vat 76 the proportion of sand will be one part sand and from six to seven and one-half parts of the asphalt mixture from vat 60. Preferably the proportion of asphalt from vat 60 will be closer to the seven and one-half parts ratio because of the better flow characteristics at 60 F. and above and thereby the puncturing-sealing characteristics of the asphalt are enhanced.

Because of the viscosity of the asphalt, the mixture in vat 76 is maintained by any suitable means at about 325° F. during its mixing and holding period. Thereby, when the mixture is discharged from outlet pipe 82 between guides 86 and 88 the asphalt will be at 325° F. or less because of the heat loss in passing through the discharge system and into the puddle 84 above the rolls 46 and 48.

Figure 9:
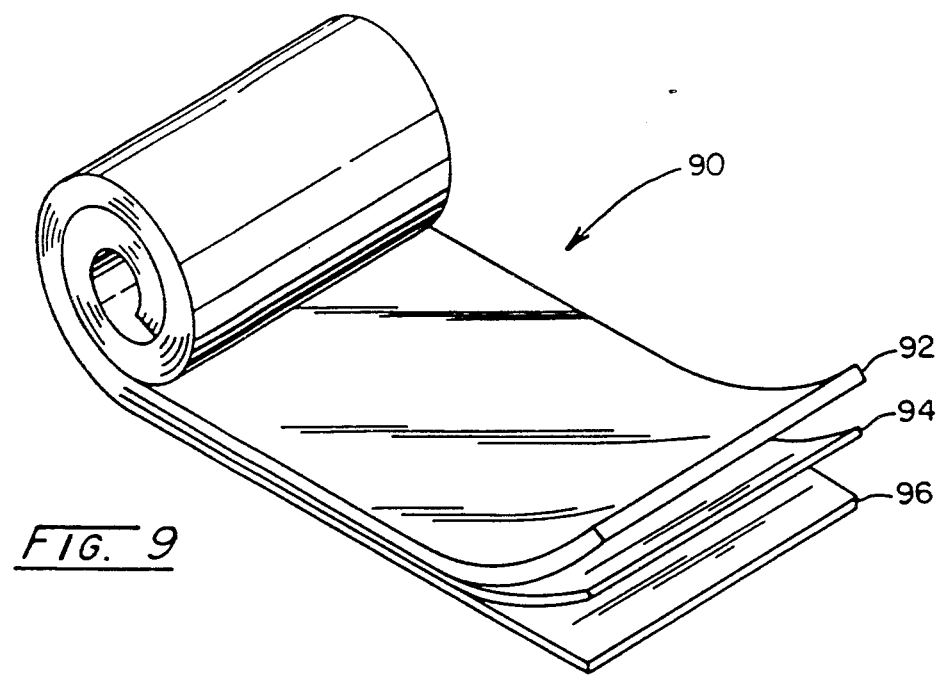
FIG. 9 is a perspective view of a roll of underlayment according to this invention showing the layers, not in proportion.
Figure 10:
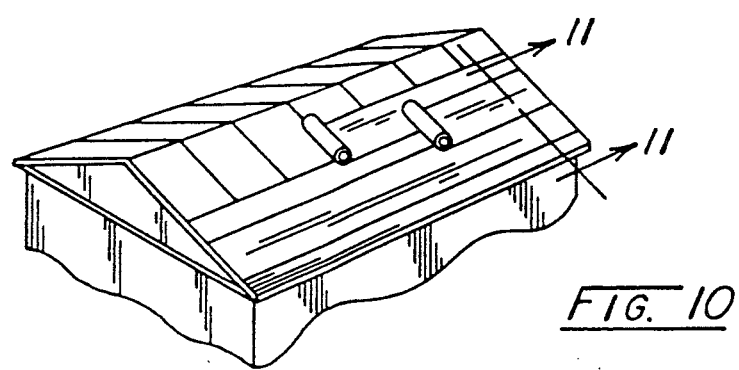
FIG. 10 is a perspective view illustrating a way the roofing material of FIG. 1 is applied to a roof over the already applied underlayment of FIG. 9.
Figure 11:
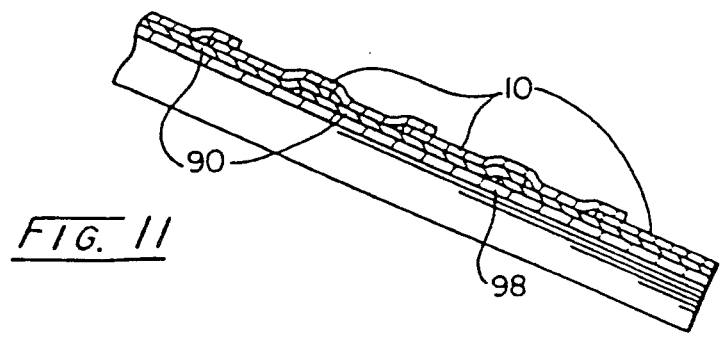
FIG. 11 is a sectional view taken along line 11—11 of FIG. 10.

It may be desirable to enhance the bond between the roof 12 and the roofing 10. In such instances an underlayment 90 is provided, see FIGS. 9–11. The roll of underlayment is applied as a series of strips directly to the prepared roof surface. The first strip is applied at the eave and parallel thereto. Preferably the strips will be about thirty-nine inches wide and the subsequently applied strips will overlay about three inches. Because the roofing strip 10 is about thirty-six inches wide and also overlays about three inches at the seams, the seams of the underlayment are off-set from the seams of the roofing, see FIG. 11. Thereby, leaks are less likely to occur.

To strengthen the overall roofing combination, the underlayment comprises a non-woven polyester mat 92 impregnated with steep roofing asphalt. Mat 92 is relatively light weight, two pounds per hundred square feet. One surface of the impregnated mat 92 is coated with an adhesive 94 which in turn is covered with a release paper 96.

In operation the release paper 96 will be striped to expose the adhesive 94 to the roof surface 98 as the underlayment 90 is rolled along the eave. The upper surface of the adhered underlayment is somewhat roughened in texture due to the unwoven polyester fibers and thereby provides an enhanced ability to bond securely to itself (layer 94) at overlaps and to asphalt layer 24 of roofing 10.

It is preferred that the roof surface be prepared by a thorough cleaning and drying to remove all loose debris, oils and moisture. Then the series of overlapping parallel strips of underlayment are applied beginning at the eaves. After the roof surface is covered by the underlayment, the series of overlapping parallel strips of roofing with the aluminum foil are applied in the same sequence, beginning at the eaves. The width of the underlayment strips and the roofing material strips being different and the difference is of a magnitude such that the overlaps of parallel underlayment strips will not be in register with any overlaps of any parallel roofing material strips. Displacement of overlaps minimizes the possibility of leakage through both layers.

Having thus described the invention in its preferred embodiment it will be clear that changes may be made in certain aspects of the procedural, proportional and apparatus parts of this invention without departing from the spirit of the invention. Accordingly, it is not intended that the invention be limited by the words used to describe the invention nor the drawings showing the same. Rather it is intended that the invention be limited only by the scope of the appended claims.

We claim:

1. A roof of a structure comprising, a roofing surface having an eave, an underlayment bonded to said roofing surface and a roofing material bonded to said underlayment, said underlayment being applied over the roofing surface as a series of overlapping parallel strips, the first said underlayment strip being applied at and parallel to said eave, the overlap with the next adjacent parallel underlayment strip being about three inches, said underlayment being formed of a mat of unwoven polyester fibers impregnated with asphalt, a layer of adhesive on said underlayment facing toward said roofing surface, said roofing material being applied over said underlayment as a series of overlapping parallel strips, the first roofing material strip being applied at and parallel to said eave, the overlap with the next adjacent parallel roofing material strip being about three inches, both said underlayment and roofing material strips having a width and a length, the width of said underlayment strip being different from the width of said roofing material strip, said difference being of such a magnitude that overlap areas of the roofing mate- rial strips are not in register with overlaps of the under- layment strips, said roofing material strips including a sheet of aluminum foil adhesively bonded to a sheet of polyethylene, said adhesive bonding being an ionomer resin, a coating of asphalt on said polyethylene covered by a release paper, said asphalt coating including a blended mixture of a straight-run, unblown asphalt with a softening point of about 100°–120° F. and a penetration of about 90–140 dmm; styrene-butadiene radial block polymer; aromatic processing oil; hydrocarbon tackifying resin; antioxidant; and silica sand, said asphalt coating serving as a bonding adhesive when applying the roofing sheet to a surface and also having the property flowing into any punctures and breaks in the polyethylene sheet, said asphalt coating having a thickness of about 0.04 inches.

2. The roof of claim 1 wherein is combined with the other components of the asphalt layer in the proportion of one part sand of about 325 mesh grade to about 6–7.5 parts of other components.

3. The roof of claim 2 wherein the asphalt coating is a mixture in about the following

| Component | Parts |
|---|---|
| Asphalt | 63 |
| Styrene-Butadiene | 13 |
| Sand | 12 |
| Antioxidant | 0.4 |
| Aromatic Processing Oil | 7 |
| Hydrocarbon Tackifying Resin | 5 |

4. The roof of claim 1 wherein the asphalt coating is a mixture in a bout the following proportions.

| Component | Parts |
|---|---|
| Asphalt | 63 |
| Styrene-Butadiene | 13 |
| Sand | 12 |
| Antioxidant | 0.4 |
| Aromatic Processing Oil | 7 |
| Hydrocarbon Tackifying Resin | 5 |

* * * * *